US006435046B1

(12) United States Patent
Beaver

(10) Patent No.: US 6,435,046 B1
(45) Date of Patent: Aug. 20, 2002

(54) MONITORING DEVICE FOR A CONTAINER

(76) Inventor: Edward B. Beaver, 4562 E. Second St., Suite I, Benicia, CA (US) 94510

( * ) Notice: Subject to any disclaimer, the term of this patent is extended or adjusted under 35 U.S.C. 154(b) by 0 days.

(21) Appl. No.: 09/442,084

(22) Filed: Nov. 16, 1999

(51) Int. Cl.[7] .............................................. G01M 19/00
(52) U.S. Cl. ..................................................... 73/866.5
(58) Field of Search ............................ 73/865.8, 865.9, 73/866.5

(56) References Cited

U.S. PATENT DOCUMENTS

| | | | | | |
|---|---|---|---|---|---|
| 412,190 | A | | 10/1889 | Krebs | |
| 1,222,035 | A | | 4/1917 | Schott | |
| 3,830,480 | A | * | 8/1974 | Grant | |
| 4,011,607 | A | | 3/1977 | Davidoff | 4/112.12 |
| 4,279,142 | A | * | 7/1981 | McIntyre | |
| 4,771,909 | A | | 9/1988 | Palkovic | 220/85 CH |
| 4,841,787 | A | * | 6/1989 | Waterman | 73/866.5 |
| 5,001,938 | A | * | 3/1991 | Downie | 73/866.5 X |
| 5,017,044 | A | | 5/1991 | Sharp | 405/53 |
| 5,118,462 | A | * | 6/1992 | Dirauf et al. | 73/866.5 X |
| 5,176,823 | A | * | 1/1993 | Roley | 73/866.5 X |
| 5,481,930 | A | * | 1/1996 | Kuo et al. | 73/866.5 |
| 5,547,102 | A | | 8/1996 | Rule et al. | 220/648 |
| 5,715,965 | A | | 2/1998 | Goulding | 220/321 |
| 6,131,473 | A | * | 10/2000 | Hoffman et al. | 73/866.5 |
| 6,148,681 | A | * | 11/2000 | Gravel et al. | 73/866.5 |

* cited by examiner

*Primary Examiner*—Thomas P. Noland
(74) *Attorney, Agent, or Firm*—Theodore J. Bielen, Jr.

(57) ABSTRACT

A device for monitoring a container such as a manway in conjunction with an analytical probe utilizing a shield. The shield covers the manway opening. The shield also includes a plurality of passages to permit communication of gases between the outside and inside of the container. The shield includes a first exterior side and a second erior side relative to the container. The fastener holds the shield to the periphery of the entrance structure of the container. A support also positions a probe to permit the same to pass from the first exterior side to the second interior side of the shield.

6 Claims, 1 Drawing Sheet

MONITORING DEVICE FOR A CONTAINER

BACKGROUND OF THE INVENTION

The present invention relates to the field of controlling access to pipes, pressure vessels, and tanks.

Tanks, pressure vessels, and pipes are employed in many manufacturing and distribution facilities. Inevitably, containers of this kind require maintenance or repair and must be disabled temporarily and opened for the purpose of access. Unfortunately, the basis of this nature left in an open condition constitute a danger to living beings which may inadvertently enter the tank and be trapped or asphyxiated by gaseous material found in the tanks. Normally, containers such as tanks possess an entrance structure, commonly referred to as a manway. Since the venting of a container is important prior to maintenance and repair work being performed on the container, the manway must be left open. Such competing objectives still pose a danger to living entities in the vicinity of the container.

In the past, covers have been devised for vessels and containers. For example, U.S. Pat. No. 5,017,044 describes a fibrous reinforced tank having a cover which is held on by a flange arrangement.

U.S. Pat. Nos. 412,190, 1,222,035, 4,011,607, and 4,771,909 describe protective covers for tubs and flasks which completely seal the opening to the same.

U.S. Pat. No. 5,547,102 shows a manway bulge restrictor in which a tension bearing structure prevents distortion of a cylindrical plastic container.

U.S. Pat. No. 5,715,965 describes a hatch plug composed of rubber which is inserted in an opening to a tank and includes an open end and a closed end to radially compress the plug around the manhole for sealing purposes.

A cover for an entrance to a container such as a tank manway which is capable of monitoring the manway in conjunction with an analytical probe would be a notable advance in the field of industrial containers.

BRIEF SUMMARY OF THE INVENTION

In accordance with the present invention a novel and useful device for monitoring a container entrance structure is herein provided.

The device of the present invention utilizes a shield which is capable of covering the entrance structure to a container such as a tank manway. The shield includes a plurality of passages through the same to permit the passage of gas to and from the interior of the container. In this way, the shield not only prevents entering of the tank through the manway, but allows ventilation of the tank prior to and during the maintenance and repair of the same. In this regard, the shield may be formed of a mesh material and include a first side, which is exterior to container, and a second side, facing the interior of the container at the manway.

Fastening means is also found in the present invention for holding the shield to the periphery of the entrance structure of the container. Such fastening means may take the form of an elastic line fixed to the edge of the shield. Also, the fastening means may take the form of a cinchable line or tie-down. In any case, the shield may be fastened or loosened for removal from the entrance structure of the container in a simple and easy manner.

The invention also possess support means for positioning an elongated probe through the shield from the first side to the second side of the same. The probe is supported by the shield so that it may be easily viewed to obtain data from the same. The shield may be constructed with a reinforcement surrounding an opening to permit the probe to slide back and forth relative to the shield without damaging the same.

Moreover, the shield first side at the exterior of the container may include a placard with indicia providing cautionary advise to persons in the vicinity of the container. Thus, the probability of the shield being accidently or inadvertantly removed to gain access to the container, is greatly diminished.

It may be apparent that a novel and useful device for monitoring a container at the entrance structure has been hereinbefore described.

It is therefore an object of the present invention to provide a device for protecting an open container against trespass by living entities while the container is in a dangerous condition.

Another object of the present invention is to provide a device for monitoring a container entrance way which allows ventilation of gases to and from the container interior while preventing access to the interior of the container by unauthorized persons.

A further object of the present invention is to provide a device for monitoring a container having an entrance structure which is capable of supporting a probe of elongated shape, used to analyze the contents of the container.

Yet another object of the present invention is to provide a device for monitoring or preventing access to an open container, or tank, which is capable of fitting over the manway of the tank and adjusts to manways of different sizes and shapes.

The invention possesses other objects and advantages especially as concerns particular characteristics and features thereof which will become apparent as the specification continues.

Reference is now made to the following detailed description of the drawings which will aid the comprehension of the invention in the present application.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
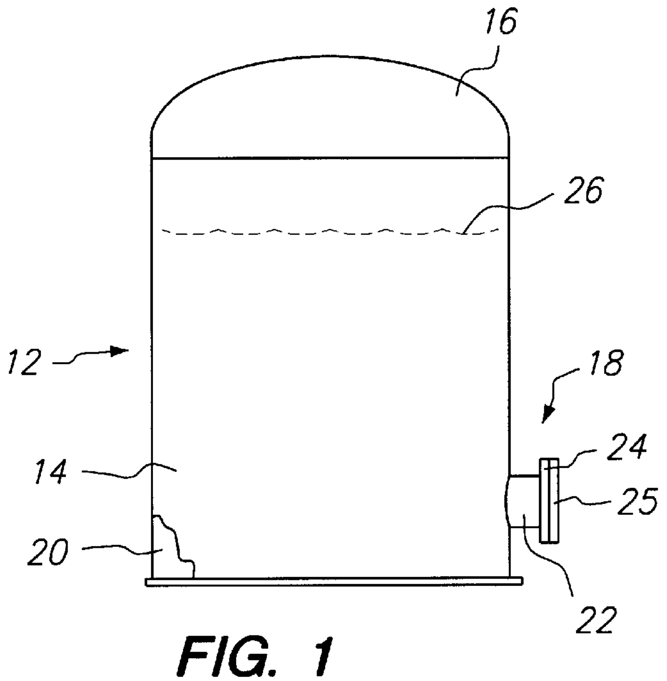
FIG. 1 is a side elevational view of a tank having a manway opening to the same.

The invention, as a whole, is shown in the drawing by reference character 10. Device 10 is used in conjunction with a tank, pressure vessel, pipe, or similar article, which has been opened for maintenance and repair. With reference to FIG. 1, a tank 12 is shown having a side wall portion 14 and an enclosed top 16. Entrance structure 18 is also found on tank 12 to gain access to interior chamber 20. Entrance structure 18 possess a tube 22 and a flange structure 24, outer part 25 of which is removable to gain entrance through structure 18 to chamber 20. Broken line 26 indicates the potential level of fluid or other material within tank 16 which has normally been removed prior to flange structure 24 being opened.

Figure 2:
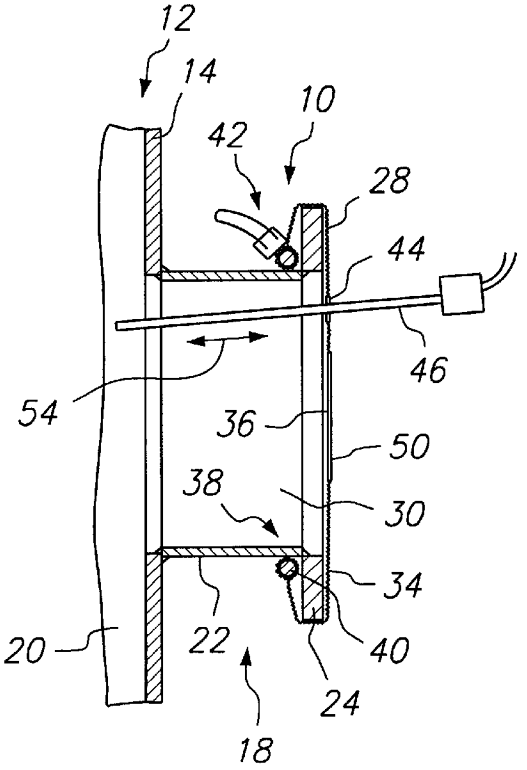
FIG. 2 is a sectional view of the manway of the tank of FIG. 1 with the device of the present invention in place and where an elongated probe is being employed.

Turning to FIG. 2, it may be seen that device 10 is in place on flange 24 of entrance structure 18. Device 10 includes a shield 28 which covers the entrance structure 18, specifically bore or tunnel 30, which leads from the exterior of tank 12 to interior chamber 20 thereof. Shield 28 includes a plurality of passages found in mesh structure 32 which may comprise the entirety of shield 28. Mesh structure 32 allows gases to pass into and out of chamber 20 or tank 12, while preventing unauthorized entry into tank 12. As shown, shield 28 includes a first side 34 on the exterior of tank 12 and a second side 36 facing the interior 20 of tank 12.

Fastening means 38 is also shown in the present invention for holding shield 28 to the periphery of entrance structure 18, specifically flange 24. Fastening means 36 may include a line 40 which is sewn, glued, or otherwise attached to the edge of shield 28. Line 40 may be composed of resilient material such as an elastomeric bungee cord and the like. As illustrated, fastening means 38 in the form of line 40 lies atop tube 22 and behind flange 24, FIG. 2. In addition, means 42 may be employed to cinch line 24 in this position if line 24 is not resilient. In any case, fastening means 40 permits the usage of shield 28 to exit structures of different sizes and shapes.

Figure 3:
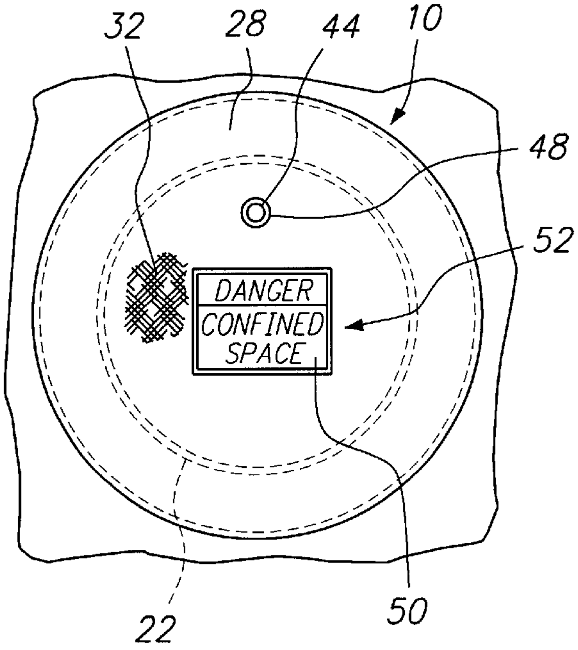
FIG. 3 is a front elevational view of the device of the present invention in place on a tank which is shown in portion.

With reference to FIG. 3, it may be observed that shield 28 includes support means 44 for elongated probe 46, FIG. 2, which is employed to analyze the contents, usually gases found in chamber 20 of tank 12. Support means 44 may include a reinforcement 48 fastened to mesh surface 32 of shield 28. Reinforcement 48 may take the form of soft material, a metal grommet, and the like. In any case, probe 46 may be slid inwardly and outwardly relative to chamber 20 of tank 12 along shield 28 without damaging the same. Placard 50 may also be attached to outer surface 44 of shield 28 and include indicia 52 warning of a dangerous condition which may lurk within chamber 20 of tank 12.

In operation, the user attaches device 10 to flange 24 of tank 12 by slipping fastening means 38 over the periphery of flange 24. Line 44 either holds itself to flange 24 by its resiliency or is cinched by cinching means 42 to the same. In place, the shield portion 28 of monitoring device 10 permits ventilation between the exterior of tank 12 and interior 20 thereof and also allows probes, such as probe 46, to be placed into chamber 20 of tank 12 without removing device 10 from flange 24. Probe 46 may be employed to determine the oxygen level within tank 12, for example. Support means and reinforcement 48 prevents damage to shield 28 due to the movement of probe 46 according to directional arrow 54.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for monitoring a container having an entrance structure in conjunction with an elongated probe, comprising:

a. a shield of mesh material, said shield covering the entrance structure of the container said shield including a plurality of passages through said shield to permit communication of gases between the outside and the inside of the container, said shield including a first side, exterior to the container, and a second side, facing the interior of the container;

b. fastening means for holding said shield to the periphery of the entrance structure of the container, said fastening means including a line extending about said entrance structure;

c. a placard affixed to said first side of said shield, said placard including indicia thereupon; and d. support means for positioning the elongated probe through said shield from said first side to said second side of said shield, the probe being held by said shield.

2. The device of claim 1 in which said line is composed of resilient material.

3. The device of claim 2 in which said line includes means for cinching said line to the entrance structure.

4. The device of claim 1 in which said support means includes an opening in said shield and a reinforcement at said opening contacting the elongated probe.

5. A device for monitoring a container having an entrance structure in conjunction with an elongated probe, comprising:

a. a shield of mesh material, said shield covering the entrance structure of the container said shield including a plurality of passages through said shield to permit communication of gases between the outside and the inside of the container, said shield including a first side, exterior to the container, and a second side, facing the interior of the container;

b. fastening means for holding said shield to the periphery of the entrance structure of the container, said fastening means including a line extending about said entrance structure; and c. support means for positioning the elongated probe through said shield from said first side to said second side of said shield, the probe being held by said shield.

6. The device of claim 5 in which said support means includes an opening in said shield and a reinforcement at said opening contacting the elongated probe.

* * * * *